United States Patent
Yang et al.

(10) Patent No.: US 12,470,325 B2
(45) Date of Patent: Nov. 11, 2025

(54) MSG3 TRANSMISSION METHOD AND APPARATUS, DEVICE, AND STORAGE MEDIUM

(71) Applicant: VIVO MOBILE COMMUNICATION CO., LTD., Dongguan (CN)

(72) Inventors: Kun Yang, Dongguan (CN); Kai Wu, Dongguan (CN); Xueming Pan, Dongguan (CN); Na Li, Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 18/352,405

(22) Filed: Jul. 14, 2023

(65) Prior Publication Data

US 2023/0361919 A1 Nov. 9, 2023

Related U.S. Application Data

(63) Continuation of application No. PCT/CN2022/072172, filed on Jan. 14, 2022.

(30) Foreign Application Priority Data

Jan. 15, 2021 (CN) .......................... 202110057859.6

(51) Int. Cl.
*H04L 1/08* (2006.01)
*H04L 1/1812* (2023.01)
*H04W 74/0833* (2024.01)

(52) U.S. Cl.
CPC .............. *H04L 1/08* (2013.01); *H04L 1/1812* (2013.01); *H04W 74/0833* (2013.01)

(58) Field of Classification Search
CPC ....... H04L 1/08; H04L 1/1812; H04L 1/1819; H04L 1/1893; H04L 1/1607; H04L 1/189;
(Continued)

(56) References Cited

U.S. PATENT DOCUMENTS

| 2016/0330768 A1 | 11/2016 | Hu et al. |
| 2019/0215872 A1 | 7/2019 | Park et al. |

(Continued)

FOREIGN PATENT DOCUMENTS

| CN | 110312319 A | 10/2019 |
| CN | 111149411 A | 5/2020 |

(Continued)

OTHER PUBLICATIONS

International Search Report & Written Opinion related to Application No. PCT/CN2022/072172; reported on Mar. 28, 2022.
(Continued)

*Primary Examiner* — Thien Nguyen
(74) *Attorney, Agent, or Firm* — von Briesen & Roper, s.c.

(57) ABSTRACT

Embodiments of this application provide an Msg3 transmission method and apparatus, a device, and a storage medium. The method includes: receiving, by a terminal device, Msg3 repetition indication information transmitted by a network device, and determining a configuration parameter for Msg3 repetition; and performing Msg3 repetition according to the Msg3 repetition indication information.

20 Claims, 4 Drawing Sheets

---

A terminal device receives Msg3 repetition indication information transmitted by a network device and determines a configuration parameter for Msg3 repetition — S201

Perform Msg3 repetition according to the Msg3 repetition indication information — S202

(58) Field of Classification Search
CPC ........... H04W 74/006; H04W 74/0833; H04W 74/004
See application file for complete search history.

(56) References Cited

U.S. PATENT DOCUMENTS

| | | | |
|---|---|---|---|
| 2019/0342921 A1 | 11/2019 | Loehr et al. | |
| 2020/0288509 A1* | 9/2020 | Park | H04W 52/0216 |
| 2020/0367179 A1* | 11/2020 | Shan | H04W 72/20 |
| 2021/0352689 A1 | 11/2021 | Jung et al. | |
| 2022/0015150 A1* | 1/2022 | Ye | H04W 72/542 |
| 2023/0164844 A1* | 5/2023 | Lei | H04W 74/0833 370/330 |

FOREIGN PATENT DOCUMENTS

| | | |
|---|---|---|
| CN | 111865501 A | 10/2020 |
| CN | 112040558 A | 12/2020 |
| WO | 2019216818 A1 | 11/2019 |
| WO | 2020060075 A1 | 3/2020 |

OTHER PUBLICATIONS

Samsung, "Coverage enhancement for channels other than PUSCH and PUCCH", Oct. 26-Nov. 13, 2020, 3GPP TSG RAN WG1 #103-e e-Meeting, R1-2008183.

Japanese Office Action related to Application No. 2023-543050; reported on Aug. 27, 2024.

Chinese Office Action related to Application No. 2021100578596; reported on Aug. 12, 2024.

Wilus Inc., "Discussion on potential techniques for Coverage enhancement for channels other than PUSCH and PUCCH", Oct. 26-Nov. 13, 2020, 3GPP TSG RAN WG1 #103-e e-Meeting, R1-2008731.

* cited by examiner

MSG3 TRANSMISSION METHOD AND APPARATUS, DEVICE, AND STORAGE MEDIUM

This application is a continuation application of PCT International Application No. PCT/CN2022/072172 filed on Jan. 14, 2022, which claims priority to Chinese Patent Application No. 202110057859.6, filed with the China National Intellectual Property Administration on Jan. 15, 2021 and entitled "MSG3 TRANSMISSION METHOD AND APPARATUS, DEVICE, AND STORAGE MEDIUM". The entire contents of each of the above-referenced applications are expressly incorporated herein by reference.

TECHNICAL FIELD

This application pertains to the field of communications technologies, and specifically relates to an Msg3 transmission method and apparatus, a device, and a storage medium.

BACKGROUND

In the random access procedure defined in the new radio (NR) Release 15/16 (Rel 15/16), a message 3 (Msg3) is transmitted only once per scheduling. If the Msg3 transmission fails, a terminal device needs to perform a random access procedure again.

Evaluation of various physical channels in NR Rel17 has revealed that the robustness of Msg3 in a contention-based access procedure is lower than that of other physical channels. This results in a higher likelihood of random access failure for a terminal device at a cell edge during the random access procedure, leading to an increase in random access time.

SUMMARY

According to a first aspect, an embodiment of this application provides an Msg3 transmission method including:
  receiving, by a terminal device, Msg3 repetition indication information transmitted by a network device, and determining a configuration parameter for Msg3 repetition; and
  performing Msg3 repetition according to the Msg3 repetition indication information.

According to a second aspect, an embodiment of this application provides an Msg3 transmission method including:
  transmitting, by a network device, Msg3 repetition indication information to a terminal device, where the Msg3 repetition indication information is used by the terminal device to determine a configuration parameter for Msg3 repetition; and
  receiving a repetition of an Msg3 transmitted by the terminal device according to the Msg3 repetition indication information.

According to a third aspect, an embodiment of this application provides an Msg3 transmission apparatus including:
  a first receiving module configured to receive Msg3 repetition indication information transmitted by a network device, and determine a configuration parameter for Msg3 repetition; and
  a first transmitting module configured to perform Msg3 repetition according to the Msg3 repetition indication information.

According to a fourth aspect, an embodiment of this application provides an Msg3 transmission apparatus including:
  a third transmitting module configured to transmit Msg3 repetition indication information to a terminal device, where the Msg3 repetition indication information is used by the terminal device to determine a configuration parameter for Msg3 repetition; and
  a third receiving module configured to receive a repetition of an Msg3 transmitted by the terminal device according to the Msg3 repetition indication information.

According to a fifth aspect, an embodiment of this application provides a terminal device including a processor, a memory, and a program or instructions stored in the memory and capable of running on the processor, and when the program or the instructions are executed by the processor, the steps of the method according to the first aspect are implemented.

According to a sixth aspect, an embodiment of this application provides a network device including a processor, a memory, and a program or instructions stored in the memory and capable of running on the processor, and when the program or the instructions are executed by the processor, the steps of the method according to the second aspect are implemented.

According to a seventh aspect, an embodiment of this application provides a readable storage medium, where a program or instructions are stored in the readable storage medium, and when the program or instructions are executed by a processor, the steps of the method according to the first aspect or the second aspect are implemented.

According to an eighth aspect, an embodiment of this application provides a chip, where the chip includes a processor and a communications interface, the communications interface is coupled to the processor, and the processor is configured to run a program or instructions to implement the method according to the first aspect or the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the terms used in this way are interchangeable in appropriate circumstances so that the embodiments of this application can be implemented in other orders than the order illustrated or described herein. In addition, "and/or" in the specification and claims represents at least one of connected objects, and the character "/" generally indicates that the associated objects have an "or" relationship.

It is worth noting that the technologies described in the embodiments of this application are not limited to long term evolution (LTE)/LTE-Advanced (LTE-A) systems, but may also be used in other wireless communications systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. However, a new radio (NR) system is described as an example below, and NR-related terminology is used in most of the following descriptions. The technology may also be used for applications other than the NR system application, for example, in 6th (6th Generation, 6G) communications systems.

Figure 1:
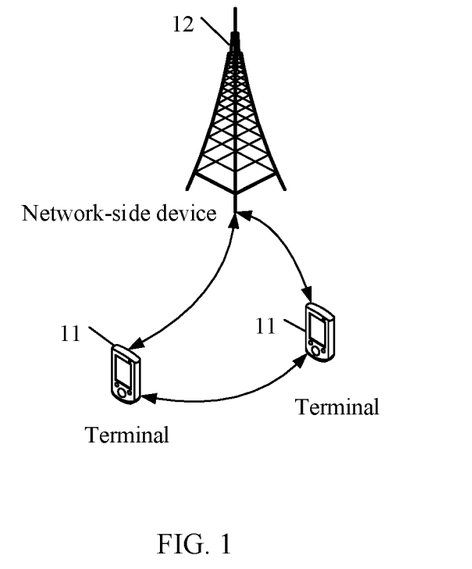
FIG. 1 is a structural diagram of a wireless communications system to which embodiments of this application may be applied.

FIG. 1 is a structural diagram of a wireless communications system to which embodiments of this application may be applied. The wireless communications system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a wrist band, earphones, glasses, and the like. It should be noted that the terminal 11 is not limited to any particular type in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. It should be noted that the base station in the NR system is only used as an example in the embodiments of this application, but a specific type of the base station is not limited.

Figure 2:
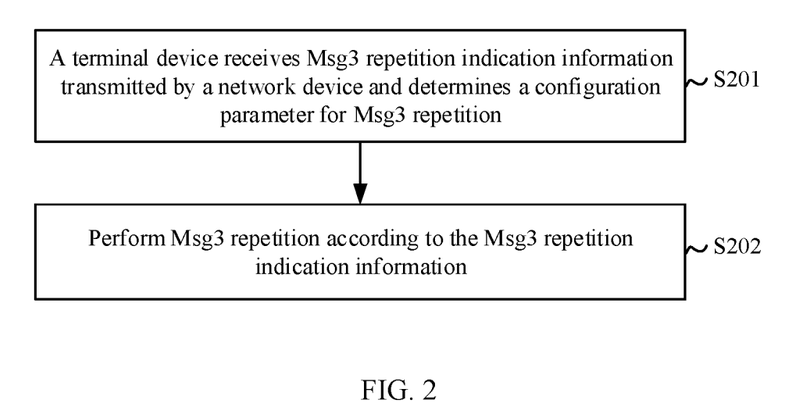
FIG. 2 is a first schematic diagram of an Msg3 transmission method according to an embodiment of this application.

FIG. 2 is a first schematic diagram of an Msg3 transmission method according to an embodiment of this application. As shown in FIG. 2, an embodiment of this application provides an Msg3 transmission method. The method may be performed by a terminal device, for example, a mobile phone. The method includes the following steps:

Step 201: The terminal receives Msg3 repetition indication information transmitted by a network device, and determines a configuration parameter for Msg3 repetition.

Step 202: Perform Msg3 repetition according to the Msg3 repetition indication information.

The Msg3 repetition indication information is contained in at least one of the following:
  a system information block SIB;
  random access response RAR information;
  downlink control information DCI scrambled by a random access radio network temporary identifier RA-RNTI; and
  DCI scrambled by a temporary cell radio network temporary identifier TC-RNTI.

Specifically, trigger information for Msg3 repetition is determined based on the random access response RAR information, downlink control information DCI scrambled by the RA-RNTI, or DCI scrambled by the TC-RNTI. The configuration parameter for Msg3 repetition is determined based on configuration information in the system information block SIB and/or a protocol-predefined parameter together with dynamic indication information of the random access response RAR information, downlink control information DCI scrambled by the RA-RNTI, or DCI scrambled by the TC-RNTI.

Optionally, before the performing Msg3 repetition according to the Msg3 repetition indication information, the method further includes:
  receiving a synchronization signal block SSB and a system information block that are transmitted by the network device; and
  determining, based on the SSB and the system information block, whether to request an Msg3 repetition operation from the network device.

Optionally, the system information block includes at least one of the following configuration information:
  a first threshold value T0 of signal strength/signal quality/path loss;
  a third threshold value M0 of size of an Msg3 transport block; and
  an allowable/blocked list for Msg3 transmission.

Optionally, the above configuration information may alternatively be configured for the network device and the terminal device through protocol predefinition.

The allowable/blocked list for Msg3 transmission contains an event that allows or prevents an Msg3 repetition, the event being a trigger event for a random access procedure as defined in a protocol.

Optionally, a threshold value set T0 containing a plurality of threshold values is configured based on the third threshold value M0. For example, the first threshold value in the threshold value set is configured for an Msg3 with a transport block size smaller than the third threshold value M0, and the second threshold value in the threshold value set is configured for an Msg3 with a transport block size larger than the third threshold value M0.

Optionally, a threshold value set T0 containing a plurality of threshold values is configured based on an event in the allowable list for Msg3 transmission or an event other than an event in the blocked list for Msg3 transmission, and a threshold value in the threshold value set corresponds to the aforementioned event.

Optionally, before the performing Msg3 repetition according to the Msg3 repetition indication information, the method includes:

in a case that a first condition is met, selecting, by the terminal device, a parameter corresponding to an SSB with signal quality greater than the first threshold value T0 as a configuration parameter of a first Msg1; and in a case that there are a plurality of SSBs meeting the above requirement, selecting, by the terminal device, one of the SSBs depending on the actual algorithm implementation; wherein the configuration parameter is a time-frequency resource configuration parameter for an Msg1 preamble subsequent set and random access channel RACH occasion, which are obtained based on a combination of a selected SSB number with an Msg1-related parameter corresponding to the Msg3 repetition; and if the signal quality of all SSB signals received by the terminal device is less than the first threshold value T0, the terminal device selects any one of the SSBs depending on the actual algorithm implementation; where the signal quality may be RSRP, RSRQ, or SINR.

Optionally, the terminal device performs SSB signal quality measurement according to a protocol predefined layer-1 filtering rule and selects an SSB with signal quality greater than the first threshold value T0 based on SSB signal quality output from layer-1 filtering.

Optionally, the first threshold value T0 may alternatively be determined by differencing, that is, the first threshold value T0 is the result of adding a threshold value already defined in a protocol and a differential value, where the threshold value already defined in the protocol may be a threshold value for SSB selection in a 4-step random access procedure defined in the protocol, and the differential value may be notified through a system message or predefined in the protocol.

Optionally, the first condition includes at least one of the following:
- the terminal device detecting that signal quality of all SSBs is lower than the second threshold value T1, where the second threshold value may be a threshold value for SSB selection in a 4-step random access procedure defined in the protocol, or a threshold value notified through a system message;
- the terminal device having made N random access channel RACH attempts and all of which have failed;
- the number of RACH attempts made by the terminal device having reached a first upper limit;
- the terminal device having sent the Msg1 a plurality of times, and the transmit power having increased and reached a second upper limit, the second upper limit being a value already defined in a protocol;
- data size of Msg3 having exceeded a third threshold value M0;
- Msg3 transmission having failed and continuing to fail after M repetitions; and
- Msg3 transmission having failed and the number of repetitions having reached a third upper limit.

Optionally, the second threshold value T1 may alternatively be determined by differencing, that is, the second threshold value T1 is the result of adding a threshold value already defined in a protocol and a differential value, where the threshold value already defined in the protocol may be a threshold value for SSB selection in a 4-step random access procedure defined in the protocol, and the differential value may be notified through a system message or predefined in the protocol.

Optionally, the system information block includes at least one of the following:
- number of Msg3 repetitions;
- a time domain resource assignment TDRA table used for Msg3 repetition;
- an inter-slot configuration parameter for Msg3;
- an Msg1-related parameter corresponding to Msg3 repetition; and
- an Msg2-related parameter corresponding to Msg3 repetition.

Optionally, the RAR information includes at least one of the following:
- number of Msg3 repetitions;
- a hopping pattern for Msg3 repetition; and
- a redundancy version RV of Msg3.

Optionally, the downlink control information DCI scrambled by a random access radio network temporary identifier RA-RNTI includes:
- a parsing method indication for the RAR information, where the parsing method indication is used to indicate that the terminal device performs parsing according to a RAR format in a protocol or according to a RAR format corresponding to Msg3 repetition.

Optionally, the DCI scrambled by a temporary cell radio network temporary identifier TC-RNTI includes at least one of the following:
- trigger information of Msg3 repetition;
- number of Msg3 repetitions;
- a hopping pattern for Msg3 repetition; and
- a redundancy version RV of Msg3.

Optionally, the TDRA table contains time domain configuration information and the corresponding number of Msg3 repetitions. The TDRA table is predefined in a protocol or configured for the terminal device through a system information block.

Optionally, the Msg1-related parameter corresponding to Msg3 repetition includes at least one of the following:
- a set of candidate physical random access channel PRACH preambles; and
- a time-frequency resource and periodicity for Msg1 transmission.

The configuration of at least one of the above parameters is different from the configuration of the parameter defined by the existing protocol.

Optionally, the Msg2-related parameter corresponding to Msg3 repetition includes at least one of the following:
- a RAR time window; and
- a media access control sub-protocol data unit MAC subPDU mapping rule and restriction.

Optionally, before the receiving, by a terminal device, Msg3 repetition indication information transmitted by a network device, the method includes:
- transmitting an Msg1 to the network device, where a parameter of the Msg1 is determined by a system message and/or an SSB measurement result.

The network device receives the Msg1 and measures PRACH signal quality. The network device determines an Msg3 repetition request of the terminal through a transmission parameter of the Msg1 or determines whether the terminal needs Msg3 repetition based on the PRACH signal quality. The network device determines the number of Msg3 repetitions based on the PRACH signal quality.

Specifically, in the initial access phase, the network device (base station) or terminal in a wireless network determines a trigger condition for Msg3 repetition based on the reference signal received power (RSRP)/reference signal received quality (RSRQ)/path loss of an uplink or downlink signal and/or size of an Msg3 transport block. Through a system information block (SIB), a random access response (RAR), DCI 1-0 scrambled by a random access radio network temporary identifier (RA-RNTI), or DCI 0-0 scrambled by a temporary cell radio network temporary identifier (TC-RNTI), the base station indicates that the terminal performs an Msg3 repetition and configures a parameter related to the Msg3 repetition.

Case 1

The terminal determines whether to trigger an Msg3 repetition based on RSRP/RSRQ/path loss of the current downlink signal synchronization signal block (SSB) or a CSI-RS and/or size of the Msg3. The terminal requests an Msg3 repetition from the base station through the Msg1. The base station sends a RAR to configure an Msg3 transmission parameter for the terminal, and the terminal parses the RAR based on Msg3 repetition. Specific steps are as follows:

1. The base station periodically sends the SSB and the system information block, where the system information block contains at least one of the following information:

(1) First Threshold Value T0 of Signal Strength/Signal Quality/Path Loss

The first threshold value T0 is used for selecting an SSB that satisfies the signal quality requirement for the Msg3 repetition.

How the first threshold value T0 is configured may be indicated explicitly in RRC signaling or indicated through a difference between T0 and a specific threshold value (for example, rsrp-ThresholdSSB) in the RACH procedure, or indicated implicitly through the number of Msg3 repetitions (for example, different numbers of Msg3 repetitions correspond to different differences).

The first threshold value T0 may alternatively be predefined in a protocol to maintain a fixed difference from a specific threshold value (for example, rsrp-ThresholdSSB) in the RACH procedure.

(2) Number of Msg3 Repetitions

It indicates the number of repetitions that can be configured for Msg3 repetition. The number of repetitions may be an integer or a set of a plurality of different integers. Optionally, the terminal configures a plurality of different numbers of repetitions/sets of numbers of repetitions based on size of the Msg3 transport block.

(3) Time Domain Resource Assignment (TDRA) Table Used for Msg3 Repetition

The network configures a set of new TDRA tables for the terminal, where the table includes time domain configuration information and the corresponding number of Msg3 repetitions.

Optionally, the terminal configures a plurality of different TDRA tables based on size of the Msg3 transport block, the TDRA tables carrying different numbers of repetitions.

(4) Inter-Slot Configuration Parameter for Msg3

Examples are whether inter-slot hopping is supported, and redundancy version (RV) for Msg3 PUSCH.

(5) Threshold M0 of Size of the Msg3 Transport Block or an Allowable/Blocked List (Whitelist/Blacklist) of Trigger Events Predefined in a Protocol or Notified by a System Message If the Msg3 transport block is larger/smaller than the threshold M0 or not within the whitelist of allowed events or within the event blacklist, the request for Msg3 repetition is not allowed.

(6) Msg1-Related Parameter Corresponding to Msg3 Repetition

The Msg1-related parameter includes a candidate PRACH preamble set, and a time-frequency resource and periodicity (RACH occasion) for Msg1 transmission.

At least one of the above parameters is different from the traditional Msg1 configuration parameter. That is, if the terminal needs to perform a random access procedure of Msg3 repetition, it needs to transmit the Msg1 according to new Msg1 parameters (preamble set and RO parameter).

Optionally, an Msg1 resource (preamble and RO) configured in the random access procedure of Msg3 repetition may be further divided into a plurality of small sets based on size of the Msg3 transport block.

(7) Msg2-Related Parameter Corresponding to Msg3 Repetition

For example, it includes a RAR time window, or a media access control sub-protocol data unit MAC subPDU mapping rule and restriction.

It should be noted that there may be mappings among the above parameters, the mappings may be predefined in a protocol or specified during system message configuration. The parameters that may be in mappings include:

Msg1 preamble set and/or random access channel occasion (RACH occasion, RO) resource;
normal/new TDRA table;
normal/new Msg3 MAC subPDU format; and
SSB threshold value T0.

For the above parameters, mappings may be specified through a system message.

2. The terminal detects the signal quality RSRP of each SSB and determines whether to request Msg3 repetition.

In a case that the terminal detects that the signal quality of all SSBs is lower than the threshold value T0, optionally, an algorithm for the terminal to select an SSB may be determined by the terminal implementation (for example, an SSB with best signal quality is selected). In a case that the terminal detects that the signal quality of all SSBs is lower than the second threshold value T1 (rsrp-ThresholdSSB) and that at least one SSB has signal quality higher than the first threshold value T0, the terminal selects one of the SSB with signal quality higher than the first threshold value T0 for use in Msg1 configuration parameter calculation.

When the terminal meets at least one of the following conditions defined in a protocol, the terminal chooses to request Msg3 repetition and executes the above SSB measurement and selection criteria:

The terminal receiving no RAR (or the RACH procedure being unsuccessful) after making N attempts to send RACH (making N RACH attempts) according to the 4-step random access procedure defined in Rel-15/16, where N is configured by the protocol or higher layer signaling; or
the number of RACH attempts made by the terminal having reached an upper limit; or
the terminal having sent the Msg1 a plurality of times, and the transmit power having increased and reached an upper limit for uplink; or
data size of Msg3 having exceeded a threshold; or
in a normal random access procedure, Msg3 transmission having failed and continuing to fail after M repetitions or after an upper limit of Msg3 repetitions, where M is indicated by a system message.

Optionally, the terminal still uses an SSB selected in a normal RACH procedure or selects an SSB according to the above SSB measurement and selection criteria.

Optionally, after performing layer-1 filtering on the SSB signal quality, the terminal selects an SSB with signal quality greater than the first threshold value T0 based on the SSB signal quality output from the layer-1 filtering and transmits the Msg1 on the corresponding Msg1 time-frequency resource. Alternatively, the terminal selects a same SSB as before the request, or the terminal performs SSB re-measurement and selects an available SSB according to the above criteria when switching from a normal PRACH procedure to an Msg3 repetition PRACH procedure.

3. The base station performs Msg1 detection on the corresponding time-frequency resource RO and determines whether there is a terminal requesting Msg3 repetition.

If the base station detects a new PRACH preamble after detecting an Msg1 on a new Msg1 RO resource, it indicates that a terminal has requested an Msg3 repetition random access procedure. The base station determines the number of Msg3 repetitions based on the signal quality of the Msg1 and performs resource scheduling.

4. The base station transmits a RAR and corresponding DCI 1-0 scrambled by an RA-RNTI to configure the parameter (such as the number of repetitions, intra-slot or inter-slot hopping pattern, and RV version) for Msg3 repetition of the terminal.

Msg3 repetition may be indicated in the following methods.

(1) The base station sends normal DCI 1-0 scrambled by an RA-RNTI and new RAR information or DCI 0-0 scrambled by a TC-RNTI. In the new RAR information, original fields in RAR information are compressed to add a new field to indicate the configuration information for Msg3 repetition.

Optionally, the new RAR information has a same length as normal RAR information.

(2) Some fields in RAR/DCI 0-0 are compressed to reduce their indication range and bits obtained by the compression are used to indicate the number of Msg3 repetitions.

For example, in a normal RAR message, the modulation and coding scheme (MCS) occupies 4 bits and is compressed into 3 bits. Only the first 8 MCS configurations in an MCS table are used for Msg3, or certain 8 MCS configurations are used as defined in a protocol.

Alternatively, power control occupies 3 bits and is compressed into 2 bits to reduce the adjustment range of power control.

Alternatively, bit(s) occupied by the CSI request field are reserved and may be used to indicate the number of Msg3 repetitions.

Alternatively, a field for another purpose is compressed. The bits obtained by the compression are combined to transmit the information on the number of Msg3 repetitions.

The number of Msg3 repetitions may be a set of a plurality of values configured by a system message, and a corresponding field in a RAR is used to indicate a corresponding value in the set and/or an Msg3 RV version.

A frequency hopping enable field in the RAR may be redefined as an inter-slot frequency hopping enable field.

(3) Specially, the number of Msg3 repetitions may be a single value. In this case, only 1 bit in the RAR message or the DCI 1-0 scrambled by an RA-RNTI or the DCI 0-0 scrambled by a TC-RNTI is needed to indicate whether to trigger Msg3 repetition.

(4) The base station configures a PUSCH TDRA table specific to Msg3 repetition through a system message, where the TDRA table contains information on Msg3 repetition.

After receiving a RAR message, the terminal determines each slot resource of an Msg3 PUSCH and the number of repetitions according to TDRA fields.

(5) A reserved field in the DCI 1-0 scrambled by an RA-RNTI is used to indicate to the terminal how to interpret a corresponding scheduling RAR: whether to interpret it as a normal RAR or as a newly defined RAR.

(6) A protocol defines an LCD (Logical Channel ID) corresponding to Msg3 repetition to indicate that the terminal parses received data according to the RAR format for Msg3 repetition.

(7) A reserved field of 1 bit in a subPDU is used to indicate a subPDU type, that is, indicate a RAR type.

Optionally, the RAR for Msg3 repetition is arranged in the last MAC subPDU in an MAC PDU, if there is Msg3 repetition.

Optionally, it is predefined in a protocol or notified in a system message that only one or several RAR subPDUs in an MAC PDU are RARs used for Msg3 repetition.

Optionally, the system does not expect both configurations.

5. After successfully parsing a RAR, the terminal transmits the Msg3 on a plurality of corresponding slots according to scheduling information.

The terminal determines a RAR message type based on the RAPID, LCD, subPDU reserved field, or reserved field of the DCI 1-0 scrambled by an RA-RNTI, and performs data parsing.

Case 2

The terminal transmits the Msg1, and the base station determines whether the terminal needs to perform an Msg3 repetition procedure based on the Msg1 and in an Msg2 stage, notifies the terminal to perform Msg3 repetition.

1. The base station periodically sends the SSB and the system information block, where the system information block contains at least one of the following information:

(1) Number of Msg3 Repetitions

It indicates the number of repetitions that can be configured for Msg3 repetition. The number of repetitions may be an integer or a set of a plurality of different integers.

(2) TDRA Table Used for Msg3 Repetition

The network configures a set of new TDRA tables for the terminal, where the table includes time domain configuration information and the corresponding number of Msg3 repetitions.

(3) Inter-Slot Configuration Parameter for Msg3

Examples are whether inter-slot hopping is supported, and RV version of Msg3 PUSCH.

(4) Msg2 RAR Time Window Corresponding to Msg3 Repetition Procedure

2. The terminal transmits the Msg1 according to a random access procedure defined in the Rel-15/16 protocol.

3. The base station receives the Msg1 and measures the signal strength of the Msg1.

If the signal strength is lower than the second threshold T1, the base station sends a RAR and DCI 1-0 scrambled by an RA-RNTI to schedule the terminal to perform Msg3 repetition.

Msg3 repetition may be indicated in the following methods.

(1) A reserved field in DCI 1-0 is used to indicate to the terminal how to interpret a RAR: whether to interpret it as a normal RAR or a new RAR. Alternatively, both types of RAR message formats are considered in the parsing attempts. If the RAR is successfully parsed according to a new RAR format, an Msg3 repetition procedure is performed; otherwise, a normal RACH procedure is performed.

2. A reserved field (CSI request field) in RAR is used to indicate a RAR type. If the field is 1, it indicates that the terminal needs to perform the parsing according to the RAR type corresponding to Msg3 repetition, that is, an Msg3 repetition mechanism is triggered.

(3) The base station sends two types of DCI 1-0 scrambled by an RA-RNTI corresponding to normal RAR scheduling and new RAR scheduling, respectively.

Optionally, these two types of DCI 1-0 have different RAR windows, with the window of the new RAR being after the window of the normal RAR; or optionally, it is predefined that the normal RAR is sent before the new RAR. For a terminal with the function of Msg3 repetition, one configuration decoding result of the two RARs is selected for Msg3 transmission.

Optionally, the normal RAR and the new RAR are sent in a same MAC PDU. The normal RAR is arranged before the new RAR, or the new RAR can only be arranged in the last few subPDUs of the MAC PDU.

4. The terminal with the function of Msg3 repetition performs detection for two types of RARs separately and transmits the Msg3 according to the scheduling information.

5. Optionally, if the terminal transmits the Msg3 a plurality of times according to the normal Msg3 transmission procedure (in special cases, Msg3 repetition is triggered after the first unsuccessful Msg3 reception), and the base station still fails to receive it, the base station transmits DCI 0_0 scrambled by a TC-RNTI. A reserved field in the DCI 0_0 is used to indicate that the terminal switches to the Msg3 repetition mode, and specify the number of repetitions and RV version. Alternatively, the DCI 0_0 is used to indicate that the terminal executes the Msg3 repetition procedure in case 1.

According to the Msg3 transmission method provided in this embodiment of this application, Msg3 repetition is performed based on a channel status. This improves the reliability of Msg3 transmission, reduces the number of repetitions, and ensures the efficiency of random access procedure execution.

Figure 3:
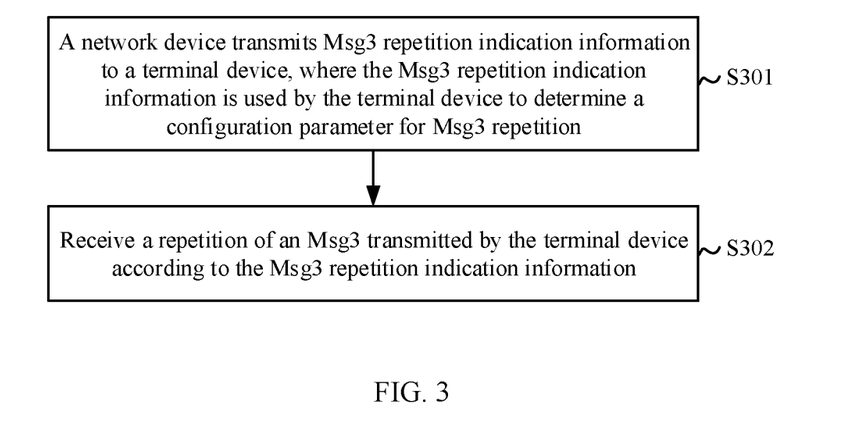
FIG. 3 is a second schematic diagram of an Msg3 transmission method according to an embodiment of this application.

FIG. 3 is a second schematic diagram of an Msg3 transmission method according to an embodiment of this application. As shown in FIG. 3, an embodiment of this application provides an Msg3 transmission method. The method may be performed by a network device, for example, a base station. The method includes the following steps:

Step 301: The network device transmits Msg3 repetition indication information to a terminal device, where the Msg3 repetition indication information is used by the terminal device to determine a configuration parameter for Msg3 repetition.

Step 302: Receive a repetition of an Msg3 transmitted by the terminal device according to the Msg3 repetition indication information.

Optionally, the Msg3 repetition indication information is contained in at least one of the following:
a system information block SIB;
random access response RAR information;
downlink control information DCI scrambled by a random access radio network temporary identifier RA-RNTI; and
DCI scrambled by a temporary cell radio network temporary identifier TC-RNTI.

Optionally, before the receiving a repetition of an Msg3 transmitted by the terminal device according to the Msg3 repetition indication information, the method further includes:
transmitting a synchronization signal block SSB and a system information block to the terminal device; where the SSB and the system information block are used by the terminal device to determine whether to request an Msg3 repetition operation from the network device.

Optionally, the system information block includes at least one of the following:
a first threshold value T0 of signal strength/signal quality/path loss;
a third threshold value M0 of size of an Msg3 transport block; and
an allowable/blocked list for Msg3 transmission.

Optionally, the system information block includes at least one of the following:
number of Msg3 repetitions;
a time domain resource assignment TDRA table used for Msg3 repetition;
an inter-slot configuration parameter for Msg3;
an Msg1-related parameter corresponding to Msg3 repetition; and
an Msg2-related parameter corresponding to Msg3 repetition.

Optionally, the RAR information includes at least one of the following:
number of Msg3 repetitions;
a hopping pattern for Msg3 repetition; and
a redundancy version RV of Msg3.

Optionally, the downlink control information DCI scrambled by a random access radio network temporary identifier RA-RNTI includes:
a parsing method indication for the RAR information, where the parsing method indication is used to indicate that the terminal device performs parsing according to a RAR format in a protocol or according to a RAR format corresponding to Msg3 repetition.

Optionally, the DCI scrambled by a temporary cell radio network temporary identifier TC-RNTI includes at least one of the following:
trigger information of Msg3 repetition;
number of Msg3 repetitions;
a hopping pattern for Msg3 repetition; and
a redundancy version RV of Msg3.

Optionally, the TDRA table contains time domain configuration information and the corresponding number of Msg3 repetitions.

Optionally, the Msg1-related parameter corresponding to Msg3 repetition includes at least one of the following:
a set of candidate physical random access channel PRACH preambles; and
a time-frequency resource and periodicity for Msg1 transmission.

Optionally, the Msg2-related parameter corresponding to Msg3 repetition includes at least one of the following:
a RAR time window; and
a media access control sub-protocol data unit MAC subPDU mapping rule and restriction.

Optionally, before the transmitting, by the network device, Msg3 repetition indication information to a terminal device, the method includes:
receiving an Msg1 transmitted by the terminal device, where a parameter of the Msg1 is determined by a system message and/or an SSB measurement result.

According to the Msg3 transmission method provided in this embodiment of this application, Msg3 repetition is performed based on a channel status. This improves the reliability of Msg3 transmission, reduces the number of repetitions, and ensures the efficiency of random access procedure execution.

Figure 4:
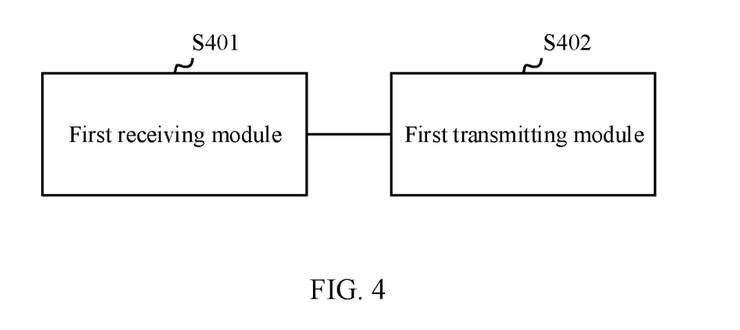
FIG. 4 is a first schematic diagram of an Msg3 transmission apparatus according to an embodiment of this application.

FIG. 4 is a first schematic diagram of an Msg3 transmission apparatus according to an embodiment of this application. As shown in FIG. 4. an embodiment of this application provides an Msg3 transmission apparatus including a first receiving module 401 and a first transmitting module 402, where the first receiving module 401 is configured to receive Msg3 repetition indication information transmitted by a network device, and determine a configuration parameter for Msg3 repetition; and the first transmitting module 402 is configured to perform Msg3 repetition according to the Msg3 repetition indication information.

Optionally, the Msg3 repetition indication information is contained in at least one of the following:
a system information block SIB;
random access response RAR information;
downlink control information DCI scrambled by a random access radio network temporary identifier RA-RNTI; and
DCI scrambled by a temporary cell radio network temporary identifier TC-RNTI.

Optionally, a second receiving module and a determination module are further included.

The second receiving module is configured to receive a synchronization signal block SSB and a system information block that are transmitted by the network device; and
the determination module is configured to determine, based on the SSB and the system information block, whether to request an Msg3 repetition operation from the network device.

Optionally, the system information block includes at least one of the following:
a first threshold value T0 of signal strength/signal quality/path loss;
a third threshold value M0 of size of an Msg3 transport block; and
an allowable/blocked list for Msg3 transmission.

Optionally, a selection module is further included.

The selection module is configured to: in a case that a first condition is met, select a parameter corresponding to an SSB with signal quality greater than the first threshold value T0 as a configuration parameter of a first Msg1; where the configuration parameter is a time-frequency resource configuration parameter for an Msg1 preamble subsequent set and random access channel RACH occasion, which are obtained based on a combination of a selected SSB number with an Msg1-related parameter corresponding to the Msg3 repetition.

Optionally, the first condition includes at least one of the following:
the terminal device having detected that signal quality of all SSBs is lower than the second threshold value T1, where the second threshold value is a threshold value for SSB selection in a 4-step random access procedure specified in a protocol;
the terminal device having made N random access channel RACH attempts and all of which have failed;
the number of RACH attempts made by the terminal device having reached a first upper limit;
the terminal device having sent the Msg1 a plurality of times, and the transmit power having increased and reached a second upper limit;
data size of Msg3 having exceeded a third threshold value M0;
Msg3 transmission having failed and continuing to fail after M repetitions; and
Msg3 transmission having failed and the number of repetitions having reached a third upper limit.

Optionally, the system information block includes at least one of the following:
number of Msg3 repetitions;
a time domain resource assignment TDRA table used for Msg3 repetition;
an inter-slot configuration parameter for Msg3;
an Msg1-related parameter corresponding to Msg3 repetition; and
an Msg2-related parameter corresponding to Msg3 repetition.

Optionally, the RAR information includes at least one of the following:
number of Msg3 repetitions;
a hopping pattern for Msg3 repetition; and
a redundancy version RV of Msg3.

Optionally, the downlink control information DCI scrambled by a random access radio network temporary identifier RA-RNTI includes:
a parsing method indication for the RAR information, where the parsing method indication is used to indicate that the terminal device performs parsing according to a RAR format in a protocol or according to a RAR format corresponding to Msg3 repetition.

Optionally, the DCI scrambled by a temporary cell radio network temporary identifier TC-RNTI includes at least one of the following:
trigger information of Msg3 repetition;
number of Msg3 repetitions;
a hopping pattern for Msg3 repetition; and
a redundancy version RV of Msg3.

Optionally, the TDRA table contains time domain configuration information and the corresponding number of Msg3 repetitions.

Optionally, the Msg1-related parameter corresponding to Msg3 repetition includes at least one of the following:
a set of candidate physical random access channel PRACH preambles; and
a time-frequency resource and periodicity for Msg1 transmission.

Optionally, the Msg2-related parameter corresponding to Msg3 repetition includes at least one of the following:
a RAR time window; and
a media access control sub-protocol data unit MAC subPDU mapping rule and restriction.

Optionally, a second transmitting module is further included;

The second transmitting module is configured to transmit an Msg1 to a base station, where a parameter of the Msg1 is determined by a system message and/or an SSB measurement result.

The above Msg3 transmission apparatus provided in this embodiment of this application is capable of implementing all the method steps implemented in the above method embodiments performed by the terminal device, with the same technical effects achieved, and the same parts and beneficial effects of this embodiment and the method embodiments will not be specifically described herein again.

The Msg3 transmission apparatus in this embodiment of this application may be an apparatus or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine or the like, which are not specifically limited in the embodiments of this application.

The Msg3 transmission apparatus in this embodiment of this application may be an apparatus with an operating system. The operating system may be an android (Android) operating system, may be an iOS operating system, or may be another possible operating system. This is not specifically limited in this embodiment of this application.

Figure 5:
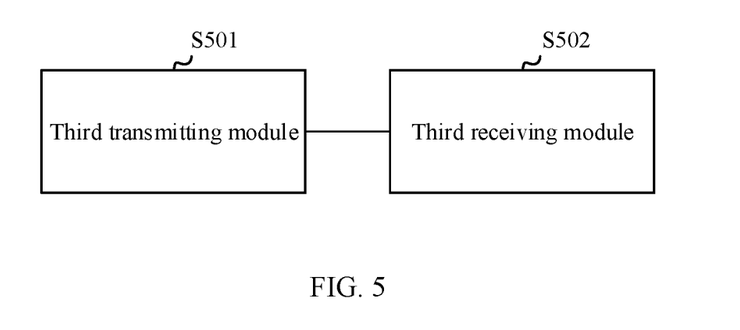
FIG. 5 is a second schematic diagram of an Msg3 transmission apparatus according to an embodiment of this application.

FIG. 5 is a second schematic diagram of an Msg3 transmission apparatus according to an embodiment of this application. As shown in FIG. 5, an embodiment of this application provides an Msg3 transmission apparatus including a third transmitting module 501 and a third receiving module 502, where:

the third transmitting module is configured to transmit Msg3 repetition indication information to a terminal device, where the Msg3 repetition indication information is used by the terminal device to determine a configuration parameter for Msg3 repetition; and the third receiving module is configured to receive a repetition of an Msg3 transmitted by the terminal device according to the Msg3 repetition indication information.

Optionally, the Msg3 repetition indication information is contained in at least one of the following:

a system information block SIB;

random access response RAR information;

downlink control information DCI scrambled by a random access radio network temporary identifier RA-RNTI; and DCI scrambled by a temporary cell radio network temporary identifier TC-RNTI.

Optionally, a fourth transmitting module is further included.

The fourth transmitting module is configured to transmit a synchronization signal block SSB and a system information block to the terminal device; and the SSB and the system information block are used by the terminal device to determine whether to request an Msg3 repetition operation from the network device.

Optionally, the system information block includes at least one of the following:

a first threshold value T0 of signal strength/signal quality/path loss;

a third threshold value M0 of size of an Msg3 transport block; and an allowable/blocked list for Msg3 transmission.

Optionally, the system information block includes at least one of the following:

number of Msg3 repetitions;

a time domain resource assignment TDRA table used for Msg3 repetition;

an inter-slot configuration parameter for Msg3;

an Msg1-related parameter corresponding to Msg3 repetition; and an Msg2-related parameter corresponding to Msg3 repetition.

Optionally, the RAR information includes at least one of the following:

number of Msg3 repetitions;

a hopping pattern for Msg3 repetition; and a redundancy version RV of Msg3.

Optionally, the downlink control information DCI scrambled by a random access radio network temporary identifier RA-RNTI includes:

a parsing method indication for the RAR information, where the parsing method indication is used to indicate that the terminal device performs parsing according to a RAR format in a protocol or according to a RAR format corresponding to Msg3 repetition.

Optionally, the DCI scrambled by a temporary cell radio network temporary identifier TC-RNTI includes at least one of the following:

trigger information of Msg3 repetition;

number of Msg3 repetitions;

a hopping pattern for Msg3 repetition; and a redundancy version RV of Msg3.

Optionally, the TDRA table contains time domain configuration information and the corresponding number of Msg3 repetitions.

Optionally, the Msg1-related parameter corresponding to Msg3 repetition includes at least one of the following:

a set of candidate physical random access channel PRACH preambles; and a time-frequency resource and periodicity for Msg1 transmission.

Optionally, the Msg2-related parameter corresponding to Msg3 repetition includes at least one of the following:

a RAR time window; and a media access control sub-protocol data unit MAC subPDU mapping rule and restriction.

Optionally, a fourth receiving module is further included;

The fourth receiving module is configured to receive an Msg1 transmitted by the terminal device, where a parameter of the Msg1 is determined by a system message and/or an SSB measurement result.

The above Msg3 transmission apparatus provided in this embodiment of this application is capable of implementing all the method steps implemented in the above method embodiments performed by the network device, with the same technical effects achieved, and the same parts and beneficial effects of this embodiment and the method embodiments will not be specifically described herein again.

Figure 6:
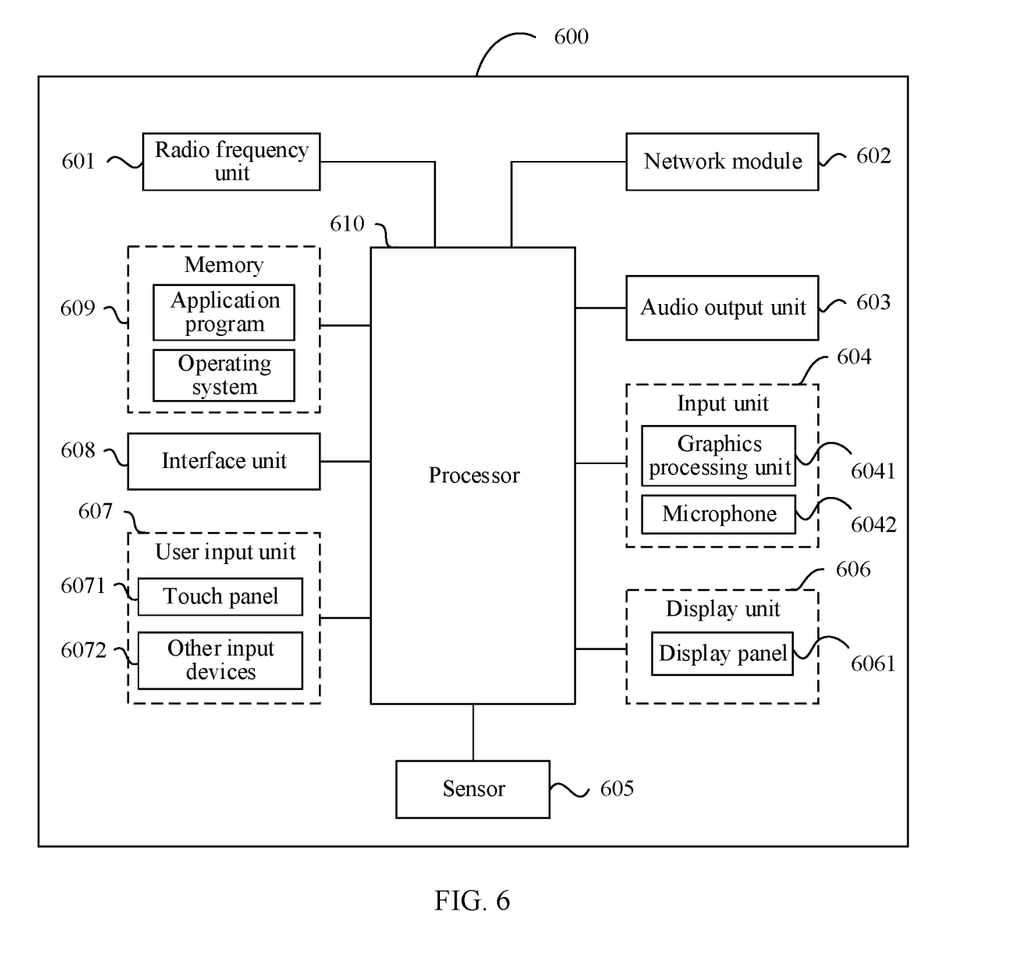
FIG. 6 is a schematic diagram of a hardware structure of a terminal according to an embodiment of this application.

FIG. 6 is a schematic diagram of a hardware structure of a terminal according to an embodiment of this application. As shown in FIG. 6, the terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

It can be understood by those skilled in the art that the terminal 600 may further include a power supply (for example, a battery) supplying power to the components. The power supply may be logically connected to the processor 610 via a power management system, so that functions such as charge management, discharge management, and power consumption management are implemented by using the power management system. The structure of the terminal shown in FIG. 6 does not constitute any limitation on the terminal, and the terminal may include more or fewer components than shown in the figure, or combine some of the components, or have different arrangements of the components. Details are not described herein.

It should be understood that in this embodiment of this application, the input unit 604 may include a graphics processing unit (GPU) 6041 and a microphone 6042. The graphics processing unit 6041 processes image data of a static picture or a video that is obtained by an image capture apparatus (for example, a camera) in an image capture mode or a video capture mode. The display unit 606 may include a display panel 6061. The display panel 6061 may be configured in a form of a liquid crystal display, an organic light-emitting diode display, or the like. The user input unit 607 includes a touch panel 6071 and other input devices 6072. The touch panel 6071 is also referred to as a touchscreen. The touch panel 6071 may include two parts: a touch detection apparatus and a touch controller. The other input devices 6072 may include but are not limited to a physical keyboard, a functional button (such as a volume control button or a power on/off button), a trackball, a mouse, and a joystick. Details are not described herein again.

In this embodiment of this application, the radio frequency unit 601 sends downlink data received from a network-side device to the processor 610 for processing, and in addition, sends uplink data to the network-side device. Generally, the radio frequency unit 601 includes but is not limited to an antenna, at least one amplifier, a transceiver, a coupler, a low noise amplifier, and a duplexer.

The memory 609 may be configured to store software programs or instructions and various data. The memory 609 may include a program or instruction storage area and a data storage area. The program or instruction storage area may store an operating system, an application program or instructions required by at least one function (for example, sound play function or image play function), and the like. In addition, the memory 609 may include a high-speed random access memory, and may further include a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, flash memory device, or other non-volatile solid-state storage device.

The processor 610 may include one or more processing units. Optionally, the processor 610 may integrate an application processor and a modem processor. The application processor mainly processes an operating system, a user interface, application programs or instructions, and the like. The modem processor mainly processes wireless communications, for example, being a baseband processor. It can be understood that the modem processor may alternatively be not integrated in the processor 610.

The radio frequency unit 601 is configured to receive Msg3 repetition indication information transmitted by a network device, and determine a configuration parameter for Msg3 repetition; and further configured to perform Msg3 repetition according to the Msg3 repetition indication information.

Optionally, the Msg3 repetition indication information is contained in at least one of the following:

a system information block SIB;

random access response RAR information;

downlink control information DCI scrambled by a random access radio network temporary identifier RA-RNTI; and DCI scrambled by a temporary cell radio network temporary identifier TC-RNTI.

Optionally, before the performing Msg3 repetition according to the Msg3 repetition indication information, the following is further included:

receiving a synchronization signal block SSB and a system information block that are transmitted by the network device; and determining, based on the SSB and the system information block, whether to request an Msg3 repetition operation from the network device.

Optionally, the system information block includes at least one of the following:

a first threshold value T0 of signal strength/signal quality/path loss;

a third threshold value M0 of size of an Msg3 transport block; and an allowable/blocked list for Msg3 transmission.

Optionally, before the performing Msg3 repetition according to the Msg3 repetition indication information, the following is included:

in a case that a first condition is met, selecting, by the terminal device, a parameter corresponding to an SSB with signal quality greater than the first threshold value T0 as a configuration parameter of a first Msg1; where the configuration parameter is a time-frequency resource configuration parameter for an Msg1 preamble subsequent set and random access channel RACH occasion, which are obtained based on a combination of a selected SSB number with an Msg1-related parameter corresponding to the Msg3 repetition.

Optionally, the first condition includes at least one of the following:

the terminal device having detected that signal quality of all SSBs is lower than the second threshold value T1, where the second threshold value is a threshold value for SSB selection in a 4-step random access procedure specified in a protocol;

the terminal device having made N random access channel RACH attempts and all of which have failed;

the number of RACH attempts made by the terminal device having reached a first upper limit;

the terminal device having sent the Msg1 a plurality of times, and the transmit power having increased and reached a second upper limit;

data size of Msg3 having exceeded a third threshold value M0;

Msg3 transmission having failed and continuing to fail after M repetitions; and

Msg3 transmission having failed and the number of repetitions having reached a third upper limit.

Optionally, the system information block includes at least one of the following:

number of Msg3 repetitions;

a time domain resource assignment TDRA table used for Msg3 repetition;

an inter-slot configuration parameter for Msg3;

an Msg1-related parameter corresponding to Msg3 repetition; and an Msg2-related parameter corresponding to Msg3 repetition.

Optionally, the RAR information includes at least one of the following:

number of Msg3 repetitions;

a hopping pattern for Msg3 repetition; and a redundancy version RV of Msg3.

Optionally, the downlink control information DCI scrambled by a random access radio network temporary identifier RA-RNTI includes:

a parsing method indication for the RAR information, where the parsing method indication is used to indicate that the terminal device performs parsing according to a RAR format in a protocol or according to a RAR format corresponding to Msg3 repetition.

Optionally, the DCI scrambled by a temporary cell radio network temporary identifier TC-RNTI includes at least one of the following:
 trigger information of Msg3 repetition;
 number of Msg3 repetitions;
 a hopping pattern for Msg3 repetition; and
 a redundancy version RV of Msg3.

Optionally, the TDRA table contains time domain configuration information and the corresponding number of Msg3 repetitions.

Optionally, the Msg1-related parameter corresponding to Msg3 repetition includes at least one of the following:
 a set of candidate physical random access channel PRACH preambles; and
 a time-frequency resource and periodicity for Msg1 transmission.

Optionally, the Msg2-related parameter corresponding to Msg3 repetition includes at least one of the following:
 a RAR time window; and
 a media access control sub-protocol data unit MAC subPDU mapping rule and restriction.

Optionally, before the receiving, by a terminal device, Msg3 repetition indication information transmitted by a network device, the following is included:
 transmitting an Msg1 to the network device, where a parameter of the Msg1 is determined by a system message and/or an SSB measurement result.

The above terminal device provided in this embodiment of this application is capable of implementing all the method steps implemented in the above method embodiments, with the same technical effects achieved, and the same parts and beneficial effects of this embodiment and the method embodiments will not be specifically described herein again.

Figure 7:
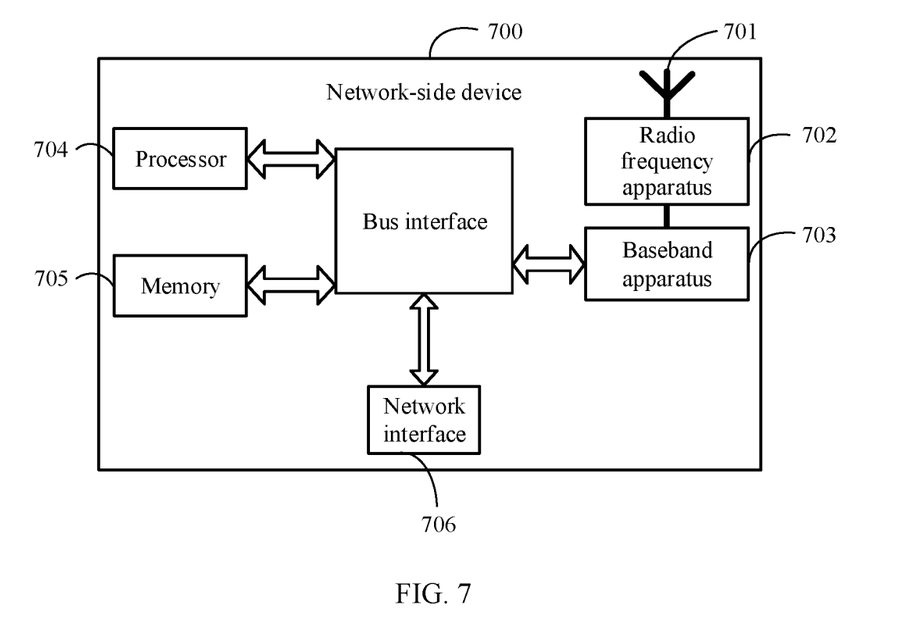
FIG. 7 is a schematic diagram of a hardware structure of a network-side device according to an embodiment of this application.

FIG. 7 is a schematic diagram of a hardware structure of a network-side device according to an embodiment of this application. As shown in FIG. 7, the network device 700 includes an antenna 701, a radio frequency apparatus 702, and a baseband apparatus 703. The antenna 701 is connected to the radio frequency apparatus 702. In an uplink direction, the radio frequency apparatus 702 receives information by using the antenna 701, and transmits the received information to the baseband apparatus 703 for processing. In a downlink direction, the baseband apparatus 703 processes to-be-transmitted information, and transmits the information to the radio frequency apparatus 702; and the radio frequency apparatus 702 processes the received information and then transmits the information by using the antenna 701.

The frequency band processing apparatus may be located in the baseband apparatus 703. The method performed by the network-side device in the foregoing embodiments may be implemented in the baseband apparatus 703, and the baseband apparatus 703 includes a processor 704 and a memory 705.

The baseband apparatus 703 may include, for example, at least one baseband processing unit, where a plurality of chips are disposed on the baseband processing unit. As shown in FIG. 7, one of the chips is, for example, the processor 704, and connected to the memory 705, to invoke the program in the memory 705 to perform the operations of the network device shown in the foregoing method embodiment.

The baseband apparatus 703 may further include a network interface 706 configured to exchange information with the radio frequency apparatus 702, where the interface is, for example, a common public radio interface (CPRI).

Specifically, the network-side device in this embodiment of the present invention further includes instructions or a program stored in the memory 705 and capable of running on the processor 704. The processor 704 invokes the instructions or program in the memory 705 to perform the following method steps:
 transmitting Msg3 repetition indication information to a terminal device, where the Msg3 repetition indication information is used by the terminal device to determine a configuration parameter for Msg3 repetition; and
 receiving a repetition of an Msg3 transmitted by the terminal device according to the Msg3 repetition indication information.

Optionally, the Msg3 repetition indication information is contained in at least one of the following:
 a system information block SIB;
 random access response RAR information;
 downlink control information DCI scrambled by a random access radio network temporary identifier RA-RNTI; and
 DCI scrambled by a temporary cell radio network temporary identifier TC-RNTI.

Optionally, before the receiving a repetition of an Msg3 transmitted by the terminal device according to the Msg3 repetition indication information, the following is further included:
 transmitting a synchronization signal block SSB and a system information block to the terminal device; where the SSB and the system information block are used by the terminal device to determine whether to request an Msg3 repetition operation from the network device.

Optionally, the system information block includes at least one of the following:
 a first threshold value T0 of signal strength/signal quality/path loss;
 a third threshold value M0 of size of an Msg3 transport block; and
 an allowable/blocked list for Msg3 transmission.

Optionally, the system information block includes at least one of the following:
 number of Msg3 repetitions;
 a time domain resource assignment TDRA table used for Msg3 repetition;
 an inter-slot configuration parameter for Msg3;
 an Msg1-related parameter corresponding to Msg3 repetition; and
 an Msg2-related parameter corresponding to Msg3 repetition.

Optionally, the RAR information includes at least one of the following:
 number of Msg3 repetitions;
 a hopping pattern for Msg3 repetition; and
 a redundancy version RV of Msg3.

Optionally, the downlink control information DCI scrambled by a random access radio network temporary identifier RA-RNTI includes:
 a parsing method indication for the RAR information, where the parsing method indication is used to indicate that the terminal device performs parsing according to a RAR format in a protocol or according to a RAR format corresponding to Msg3 repetition.

Optionally, the DCI scrambled by a temporary cell radio network temporary identifier TC-RNTI includes at least one of the following:
  trigger information of Msg3 repetition;
  number of Msg3 repetitions;
  a hopping pattern for Msg3 repetition; and
  a redundancy version RV of Msg3.

Optionally, the TDRA table contains time domain configuration information and the corresponding number of Msg3 repetitions.

Optionally, the Msg1-related parameter corresponding to Msg3 repetition includes at least one of the following:
  a set of candidate physical random access channel PRACH preambles; and
  a time-frequency resource and periodicity for Msg1 transmission.

Optionally, the Msg2-related parameter corresponding to Msg3 repetition includes at least one of the following:
  a RAR time window; and
  a media access control sub-protocol data unit MAC subPDU mapping rule and restriction.

Optionally, before the transmitting, by a network device, Msg3 repetition indication information to a terminal device, the following is included:
  receiving an Msg1 transmitted by the terminal device, where a parameter of the Msg1 is determined by a system message and/or an SSB measurement result.

The above network device provided in this embodiment of this application is capable of implementing all the method steps implemented in the above method embodiments, with the same technical effects achieved, and the same parts and beneficial effects of this embodiment and the method embodiments will not be specifically described herein again.

An embodiment of this application further provides a readable storage medium. The readable storage medium stores a program or instructions. When the program or instructions are executed by a processor, the processes of the foregoing embodiment of the Msg3 transmission method are implemented, with the same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the Msg3 transmission method, with the same technical effects achieved. To avoid repetition, details are not described herein again.

It should be understood that the chip mentioned in this embodiment of this application may also be referred to as a system on a chip or system-on-chip.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific embodiments. These specific embodiments are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A message Msg3 transmission method, comprising:
  receiving, by a terminal device, Msg3 repetition indication information transmitted by a network device, and determining a configuration parameter for Msg3 repetition; and
  performing Msg3 repetition according to the Msg3 repetition indication information,
  wherein the Msg3 repetition indication information is comprised in a system information block (SIB), and the SIB comprises:
  a first threshold value TO of signal strength/signal quality/path loss;
  a second threshold value T1; and
  a set of numbers of Msg3 repetitions,
  before the performing Msg3 repetition according to the Msg3 repetition indication information, the method further comprises:
  in a case that a first condition is met, selecting, by the terminal device, a parameter corresponding to a synchronization signal block (SSB) with signal quality greater than the first threshold value TO as a configuration parameter of a first Msg1; wherein the configuration parameter is a time-frequency resource configuration parameter for an Msg1 preamble subsequent set and random access channel (RACH) occasion, which are obtained based on a combination of a selected SSB number with an Msg1-related parameter corresponding to the Msg3 repetition.

2. The Msg3 transmission method according to claim 1, wherein the Msg3 repetition indication information is further comprised in at least one of the following:
  random access response (RAR) information;
  downlink control information (DCI) scrambled by a temporary cell radio network temporary identifier (TC-RNTI).

3. The Msg3 transmission method according to claim 1, before the performing Msg3 repetition according to the Msg3 repetition indication information, further comprising:
  receiving the SSB and the SIB that are transmitted by the network device; and
  determining, based on the SSB and the SIB, whether to request an Msg3 repetition operation from the network device.

4. The Msg3 transmission method according to claim 1, wherein the first condition comprises:
  the terminal device detecting that signal quality of all SSBs is lower than the second threshold value T1, wherein the second threshold value is a threshold value for SSB selection in a 4-step random access procedure specified in a protocol, or the second threshold value is a threshold value notified through a system message.

5. The Msg3 transmission method according to claim 2, wherein the RAR information comprises at least one of the following:
  number of Msg3 repetitions;
  an inter-slot hopping enable field for Msg3 repetition.

6. The Msg3 transmission method according to claim 2, wherein the DCI scrambled by the temporary cell radio network temporary identifier (TC-RNTI) comprises at least one of the following:
  number of Msg3 repetitions;
  a hopping pattern for Msg3 repetition.

7. The Msg3 transmission method according to claim 1, wherein the RAR information comprises an modulation and coding scheme (MCS) field, and the MCS field contains MCS configuration information and the number of Msg3 repetitions.

8. The Msg3 transmission method according to claim 1, wherein the SIB further comprises: an Msg1-related parameter corresponding to Msg3 repetition, and the Msg1-related parameter corresponding to Msg3 repetition comprises at least one of the following:
  a set of candidate physical random access channel (PRACH) preambles; and
  a time-frequency resource and periodicity for Msg1 transmission.

9. A terminal device, comprising a processor, a memory, and a program or instructions stored in the memory and capable of running on the processor, wherein when the program or instructions are executed by the processor, the processor is configured to implement the following steps:
  receiving Msg3 repetition indication information transmitted by a network device, and determining a configuration parameter for Msg3 repetition; and
  performing Msg3 repetition according to the Msg3 repetition indication information,
  wherein the Msg3 repetition indication information is comprised in a system information block (SIB) and the SIB comprises:
  a first threshold value T0 of signal strength/signal quality/path loss;
  a second threshold value T1; and
  a set of numbers of Msg3 repetitions,
  the processor is further configured to implement the following steps:
    before the performing Msg3 repetition according to the Msg3 repetition indication information, in a case that a first condition is met, selecting a parameter corresponding to a synchronization signal block (SSB) with signal quality greater than the first threshold value T0 as a configuration parameter of a first Msg1; wherein the configuration parameter is a time-frequency resource configuration parameter for an Msg1 preamble subsequent set and random access channel (RACH) occasion, which are obtained based on a combination of a selected SSB number with an Msg1-related parameter corresponding to the Msg3 repetition.

10. The terminal device according to claim 9, wherein the Msg3 repetition indication information is further comprised in at least one of the following:
  random access response (RAR) information;
  downlink control information (DCI) scrambled by a temporary cell radio network temporary identifier (TC-RNTI).

11. The terminal device according to claim 9, wherein the processor is further configured to:
  receive the SSB and the system information block that are transmitted by the network device; and
  determine, based on the SSB and the system information block, whether to request an Msg3 repetition operation from the network device.

12. A non-transitory computer-readable storage medium, configured to store a program, wherein the program, when executed, causes a processor to implement steps of the method according to claim 1.

13. The terminal device according to claim 9, wherein the first condition comprises:
  the terminal device detecting that signal quality of all SSBs is lower than the second threshold value T1, wherein the second threshold value is a threshold value for SSB selection in a 4-step random access procedure specified in a protocol, or the second threshold value is a threshold value notified through a system message.

14. The terminal device according to claim 10, wherein the RAR information comprises at least one of the following:
  number of Msg3 repetitions;
  an inter-slot hopping enable field for Msg3 repetition.

15. The terminal device according to claim 10, wherein the DCI scrambled by the temporary cell radio network temporary identifier (TC-RNTI) comprises at least one of the following:
  number of Msg3 repetitions;
  a hopping pattern for Msg3 repetition.

16. The terminal device according to claim 10, wherein the RAR information comprises an modulation and coding scheme (MCS) field, and the MCS field contains MCS configuration information and the number of Msg3 repetitions.

17. The terminal device according to claim 9, wherein the SIB further comprises: an Msg1-related parameter corresponding to Msg3 repetition, and the Msg1-related parameter corresponding to Msg3 repetition comprises at least one of the following:
  a set of candidate physical random access channel (PRACH) preambles; and
  a time-frequency resource and periodicity for Msg1 transmission.

18. The non-transitory computer-readable storage medium according to claim 12, wherein the Msg3 repetition indication information is further comprised in at least one of the following:
    random access response (RAR) information;
    downlink control information (DCI) scrambled by a temporary cell radio network temporary identifier (TC-RNTI).

19. The non-transitory computer-readable storage medium according to claim 12, wherein before the performing Msg3 repetition according to the Msg3 repetition indication information, the processor is further caused to implement the following steps:
    receiving the SSB and the SIB that are transmitted by the network device; and
    determining, based on the SSB and the SIB, whether to request an Msg3 repetition operation from the network device.

20. The non-transitory computer-readable storage medium according to claim 12, wherein the first condition comprises:
    a terminal device detecting that signal quality of all SSBs is lower than the second threshold value T1, wherein the second threshold value is a threshold value for SSB selection in a 4-step random access procedure specified in a protocol, or the second threshold value is a threshold value notified through a system message.

* * * * *